United States Patent Office 3,089,810
Patented May 14, 1963

3,089,810
PRESERVING AGENT STABILIZED WITH
CARBON DIOXIDE
Bror Olof Hager, Stockholm, Sweden
No Drawing. Filed Dec. 1, 1958, Ser. No. 777,223
Claims priority, application Sweden Apr. 27, 1954
8 Claims. (Cl. 167—38.5)

This invention relates to the provision of agents for preserving wood, and other organic materials, and is particularly concerned with the stabilization of preserving agent compositions containing a radical of an amine-forming metal—more specifically, copper—in ammoniacal solution.

In preparing earlier wood-preserving agents containing a radical of copper or other amine-forming metal in ammoniacal solution, I have used carbon dioxide as stabilizing addition.

In the practical work with these agents it has appeared very advantageous that the impregnation solution has a very high stability, and the lowest possible pH value, in order to obtain the best penetration and distribution of the agent in the timber. It has been possible to obtain this by adding a very high content of carbon dioxide to the solution. On the other hand, the content of the carbon dioxide must not be so high that it reduces the dissolving action of the ammonia to such an extent that there is a risk of precipitation. The higher is the ammonia content, the more carbon dioxide can be added; and, the carbon dioxide content can be increased comparatively more than can the ammonia content. That is to say, the higher is the ammonia content, the greater the ratio between carbon dioxide and ammonia without the risk of precipitation. In this way a more and more stable solution and a lower and lower pH can be obtained. In order to obtain the required excess of carbon dioxide, the solution should accordingly have a certain minimum ammonia content which in case of copper solutions should amount to double the metal content.

Ammonia solutions of amine-forming metal radicals may preferably be treated with carbon dioxide and/or ammonium bicarbonate in order to obtain the correct composition. Ammonium bicarbonate contains 2.6 times as much carbon dioxide as ammonia, and per se is relatively stable. Carbon dioxide—either as such or in the form of ammonium bicarbonate—should be added to such an extent that the content thereof is higher than 1.3 and less than 2.6 times the ammonia content. As a very approximate applicable rule, it may be said that the carbon dioxide content generally should amount to about double the ammonia content. Starting from the pH value, it may be said that carbon dioxide should be added to such an extent that the pH of the composition is reduced about 9 or therebelow. Preferably, a pH of about 8.5 or less should be reached. In practical operations, impregnation solutions with a pH of 8.2 have been used with a very good result. Solutions with a pH of 7.8 or even lower have been used but, as indicated above, such solutions used higher amounts of ammonia and carbon dioxide.

The statements made above may be exemplified by the following seven solutions prepared from technical raw materials and intended for full impregnation of Swedish redwood.

Table

| | The composition of the solutions in percent by weight | | | pH value |
|---|---|---|---|---|
| | Cu | NH$_3$ | CO$_2$ | |
| 1 | 0.3 | 0.6 | 1.00 | 8.75 |
| 2 | 0.3 | 0.6 | 1.13 | 8.55 |
| 3 | 0.3 | 0.6 | 1.20 | 8.42 |
| 4 | 0.3 | 0.6 | 1.27 | 8.21 |
| 5 | 0.3 | 0.6 | 1.30 | 8.10 |
| 6 | 0.3 | 0.6 | 1.32 | 8.00 |
| 7 | 0.3 | 0.8 | 1.75 | 8.10 |

In order to produce the agent, one may start for instance from copper carbonate and treat the same with concentrated ammonia, and then, as earlier mentioned, stabilize with ammonium bicarbonate, and with carbon dioxide, if required. Water is then added until the desired concentration of the solution has been obtained.

The agent may be produced with solid substances. This way generally does not give quite so good products but because this mode of preparation is of theoretical interest two concrete examples may be given.

18 g. of copper carbonate (10 g. Cu) are mixed with 93 g. of ammonium bicarbonate (20 g. NH$_3$). The mixture weighs 111 g. and contains a total of about 55 g. of carbon dioxide from both carbonates. The mixture is not soluble from the beginning. After some time the mixture reacts and its color is changed. From having been pale green, it turns beautifully dark blue. Part of the ammonia combines with the copper radical and part of the carbon dioxide leaves. When the mixture has reacted and its weight has been reduced to about 100 g. the agent is ready and contains 10 percent of copper.

The reaction can neither be carried out in a completely closed nor in a completely open manner. On the one hand, an ammonia atmosphere must be formed in order that the reaction may take place. On the other hand, carbon dioxide must be able to leave. The reaction also needs some moisture which is present in the bicarbonate. The conversion requires some days at room temperature but proceeds quickly at temperatures above 50° C. Copper hydroxide may be used instead of copper carbonate. Copper powder or cuprous oxide may also be used, but in this case oxygen must be added: the oxide, however, does not react so well. Instead of allowing the carbon dioxide to leave, the mixture can, from the beginning, be given the final proportions for instance by mixing ammonium bicarbonate with ammonium carbonate so that the correct ratio between carbon dioxide and ammonia is obtained. By this the reaction is carried out more quickly, without any gas leaving the mixture. Thus, a preservative composition embodying the principles of the present invention may be prepared by admixing 18 g. of copper carbonate (10 g. Cu; 3.5 g. CO$_2$) with 46 g. of ammonium acid carbonate (10 g. NH$_3$; 26 g. CO$_2$) and 28 g. of ammonium carbonate (10 g. NH$_3$; 13 g. CO$_2$) and allowing the components of the mixture to react in a closed vessel. When the reaction is complete the resulting reaction mixture is a solid product, amounting to about 100 grams, and containing about 10% (by weight) of copper. The reaction mixture is soluble in water. Before use, the reaction mixture may be taken up in 3⅓ liters of water to provide an impregnating agent containing 3 g. copper per liter, corresponding to Example 4 of the above table.

Technically, the manufacture of the preservative composition of the present invention is generally carried out in some one of the following ways which will give very good and completely soluble products. Copper is dissolved, to a concentration of about 200 g. of copper per liter in a water solution of ammonia, 225 g. per liter, and carbon dioxide, 200 g. per liter, while introducing air or oxygen. This concentrate is then treated with gaseous ammonia and carbon dioxide in a pressure container under agitation and under a low pressure and, if necessary, some cooling. Per liter of concentrate are in this way introduced 175 g. gaseous ammonia and 646 g. of carbon dioxide whereby a solid preserving agent is formed containing 9.3 percent copper, 18.6 ammonia and 39.4 carbon dioxide. This mixture gives aqueous solutions according to Example 4 of the table when dissolved in water to concentration corresponding to the example.

Another way to manufacture the preservative is to heat the copper-ammonia-carbon dioxide concentrate to about 90° C. for some time when a part of ammonia and carbon dioxide leaves (they are absorbed for making new concentrates) and a precipitate is produced in the concentrate. By a subsequent cooling the amount of precipitate increases. More than half the amount of copper in the concentrate is hereby precipitated (the mother-lye being returned for making new concentrates). This precipitate has a composition corresponding to the formula $$Cu(NH_3)_2CO_3H_2O$$

This precipitate can for instance be mixed with 2.3 parts of its weight of ammonium acid carbonate and 0.15 part of 25% ammonia solution. In this way a mixture is obtained containing 10.5% copper, 21% ammonia and 44.4% carbon dioxide. This mixture also gives solutions according to Example 4 of the table when dissolved to the concentration given in this example.

The precipitate can also be obtained by continuing the dissolution of copper until a strong (saturated), warm concentrate is received which concentrate then is forced by cooling to deposit the precipitate.

The agents stated above contained 9.3 to 10.5% copper. With the same contents of ammonia and carbon dioxide in relation to the copper quantity, solid agents with copper content between about 9.2% and 11% can be obtained. With less copper than 9.2%, the agent will be paste-like or will contain a solid part and some solution. Inasmuch as more ammonia and carbon dioxide are contained in order to obtain more stable solutions, the ratio of copper radical in the mixture, of course, becomes less and less, and in these cases solid agents with lower copper content can be obtained.

A solid agent according to the invention may have the following composition (in percent by weight):

10 percent of copper
20 percent of ammonia
42.3 percent of carbon dioxide

The remaining 27.7% consists of hydrogen and oxygen partly combined with the ingredients stated, partly in the form of water.

The preservative composition may be combined with other protective substances, such as fluorine, arsenic and/or chlorophenol compounds, and so on. The fluorine and arsenic compounds may be added directly to the solid substance, or to the solution thereof, in the form of ammonium salts such as ammonium fluoride or bifluoride, mono-ammonium arsenite, diammonium arsenate, and so on. In case chlorophenols are used, they should be added to the impregnation solution (not to the solid agent), and the chlorophenols should preferably be used in the form of an alkaline salt solution. Chlorophenols with 3 to 5 chlorine atoms are chiefly intended. In order to be sufficiently soluble in the impregnation solution, generally two or more different chlorophenols—isomers or not—must be mixed.

One part by weight of copper can effectively fix up to half a part by weight of fluorine (F) and/or arsenic (As). Thus, if fixing is desired, ammonium salt should not be added to more than about 10 percent of the weight of the solid agent just mentioned. A further addition of such salt does not become fixed, and such additions should not be made in agents intended for timber subjected to leaching. On the other hand, the contents of fluorine and arsenic may be increased and the fixing maintained, if chromates are added to the agent. Since the chlorophenols are fixed also in greater quantities they may be added in the desired content without the fixing degree being very much changed. They may be used for instance in an amount from 10 to 100 percent of the weight of the solid agent just mentioned. When they are used in a very high content, the character of the agent is changed to a certain extent. The protective effect is then taken over more and more by the chlorophenol.

When using these additions of fluorine and/or arsenic, the solutions should have a slightly higher content of ammonia. This is obtained by adding these substances in the form of ammonium salts, as mentioned above. By this the ratio between carbon dioxide and ammonia is somewhat reduced; it may for instance be 1:5. In reality, part of the carbon dioxide is replaced by the said negative radicals. As an example of such a solid agent with fluorine, the following agent may be stated, the same being formed of the agent earlier mentioned together with an addition of ammonium fluoride:

8.6 percent of copper,
21.5 percent of ammonia,
36.5 percent of carbon dioxide, and
4.6 percent of fluorine.

The remaining 28.8 percent consists of hydrogen and oxygen, partly combined with the substances mentioned, partly occurring as water. The fluorine may be wholly or partly replaced by arsenic (As), the remaining composition of the agent being the same.

In case a higher content of chlorophenol is used, one should also increase the ammonia content but the alkali in the chlorophenol has a certain substituting effect. On the other hand, one may here also use a lower copper content in the solution—the protective effect being, to a great extent, taken over by the chlorophenol—and in this case the ammonia content should be increased in relation to the copper in order to avoid hydrolysis.

In the case of the aforesaid addition of negative radicals, the content of ammonia preferably amounts to from about 2.5 to about 3 times the copper content.

Besides copper, other metal radicals, such as zinc, nickel, cadmium, cobalt and silver, may be used in the preserving agent. In such case about 50 percent more solvent-ammonia and carbon dioxide—are, as a rule, required than if copper were used.

Instead of part of the carbon dioxide, other acids may be included in the agent; but, as a rule, they have not so good properties as has carbon dioxide. Preferably, these acids should be volatile. Amongst operable acids are formic acid and acetic acid, for example.

As examples of agents with different composition, the following six impregnation solutions may be stated. The figures relate to percent by weight.

|   | Cu | NH₃ | CO₂ | As | F | Chlorophenol |
|---|----|-----|-----|----|----|---|
| 1 | 0.3 | 0.6 | 1.27 | | | |
| 2 | 0.3 | 0.8 | 1.75 | | | |
| 3 | 0.3 | 0.8 | 1.25 | | 0.2 | |
| 4 | 0.3 | 0.8 | 1.25 | 0.15 | | |
| 5 | 0.3 | 0.6 | 1.25 | | | 0.15 |
| 6 | 0.2 | 0.6 | 1.20 | | | 0.60 |

The arsenic—stated in percent of As in the example above—may, as earlier pointed out, be present in the composition as arsenite or arsenate or a mixture thereof; and the chlorophenol may occur as one or several alkali chlorophenol salts with 3 to 5 chlorine atoms.

The advantages which are obtained by these solutions are, in the first place, that a more uniform distribution of the agent in the outer and inner layers of the timber is obtained. In case the timber is difficult to impregnate, the advantages become greater, a greater amount of impregnation agent being absorbed per volume unit of timber. This increase often amounts to 20 percent and more, according to the difficulty of treating the timber. The increase of the impregnation solution added results in a more complete penetration of the solution into the timber and thus the timber is better and more uniformly protected. Another advantage is that the timber need not be stored for a very long time before it can be impregnated.

This application contains subject matter in common with my application Serial No. 503,902 filed April 26, 1955, now abandoned, and is a continuation-in-part of the latter.

I claim:
1. Wood-preserving agent consisting essentially of an aqueous ammoniacal solution of an hydroxide of an amine-forming metal selected from the group consisting of copper, zinc, nickel, cobalt, cadmium and silver, and carbon dioxide, the ratio of the content of carbon dioxide to the content of ammonia of the solution being within the range 1.3:1 and 2.6:1 and the pH of the solution being less than 9 and not less than 7.8.

2. Preserving agent according to claim 1, in which the amine-forming metal is copper, and in which the ammonia content of the solution is at least double the copper content.

3. Preserving agent according to claim 1, characterized in that the amine-forming metal is copper, and in that the ammonia content is 2 to 3 times the copper content.

4. Preserving agent according to claim 1, characterized in that the amine-forming metal is zinc, and in that the ammonia content is 3 to 4.5 times the zinc content.

5. Preserving agent according to claim 1, characterized in that the amine-forming metal is nickel and in that the ammonia content is 3 to 4.5 times the nickel content.

6. Preserving agent according to claim 1 characterized in that the amine-forming metal is cobalt, and in that the ammonia content is 3 to 4.5 times the cobalt content.

7. Preserving agent according to claim 1, characterized in that the pH value of the solution is from about 8.5 to about 8.0.

8. Process of making a wood-preserving aqueous solution according to claim 1, which comprises reacting a reagent selected from the group consisting of copper carbonate, copper hydroxide, cuprous oxide and metallic copper with ammonium bicarbonate and a concentrated aqueous solution of ammonia in proportions corresponding to a ratio of the total content of carbon dioxide to the content of ammonia in the resulting reaction product within the range 1.3:1 to 2.6:1, the pH of the prepared solution being less than 9 and not less than 7.8.

References Cited in the file of this patent
UNITED STATES PATENTS 2,651,648    Meyer  ---------------- Sept. 8, 1953
2,772,200    Zakheim  -------------- Nov. 27, 1956